United States Patent [19]

Pettit

[11] Patent Number: 5,045,265
[45] Date of Patent: Sep. 3, 1991

[54] METHOD OF MAKING A VARIABLE MOLDED PART

[75] Inventor: Dean A. Pettit, Owatonna, Minn.
[73] Assignee: Truth Incorporated, Owatonna, Minn.
[21] Appl. No.: 583,298
[22] Filed: Sep. 17, 1990
[51] Int. Cl.$^5$ .............................................. B29C 39/02
[52] U.S. Cl. ................................... 264/219; 249/155; 249/158; 249/159; 264/318
[58] Field of Search ............... 249/155, 156, 157, 158, 249/159; 264/318, 219, 299, 328.1

[56] References Cited

U.S. PATENT DOCUMENTS

| | | | |
|---|---|---|---|
| 1,526,401 | 2/1925 | Wanner et al. | 249/157 |
| 2,298,837 | 10/1942 | Oswald | 249/155 |

Primary Examiner—Jan H. Silbaugh
Assistant Examiner—Brian J. Eastley
Attorney, Agent, or Firm—Wood, Phillips, Mason, Recktenwald & Vansanten

[57] ABSTRACT

A method for variably making tie bar guides usable to guide tie bars within locking system housings having different inner dimensions, which tie bar guides have a body portion including four sides substantially aligned with an opening through the body portion for slidably receiving a tie bar. A mold block defines an opening for the body portion of the guide and receives material in a substantially flowable state. A cylindrical channel is also provided in the mold block along one side of said body portion opening. A semi-cylindrical pin is secured within the channel, which pin is pivoted to open a selected portion of the channel to the mold block opening and thereby extend the mold block opening and contiguous open channel to a selected outer dimension. Further, at least one slot is provided along a second side of the body portion opening. Prior to flowing material into the mold block, a selected number of substantially uniform slats sufficient to block the slot at the selected outer dimension are inserted into the slot. Finally, material is flowed into the mold block opening for forming the selected tie bar guide, the material is allowed to harden into the shape of the selected tie bar guide, and the tie bar guide is removed from the mold block.

7 Claims, 1 Drawing Sheet

U.S. Patent  Sep. 3, 1991  5,045,265
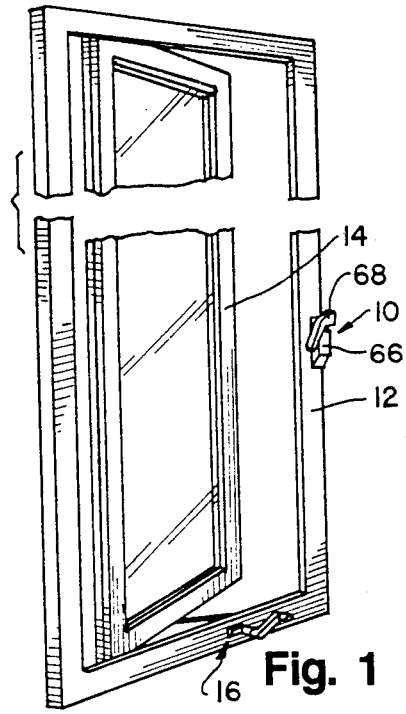
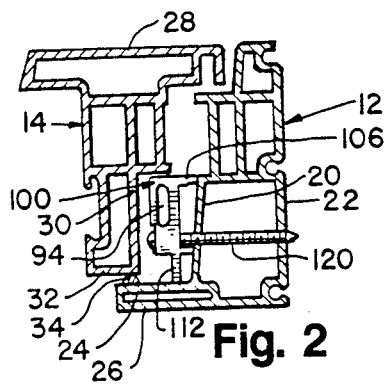
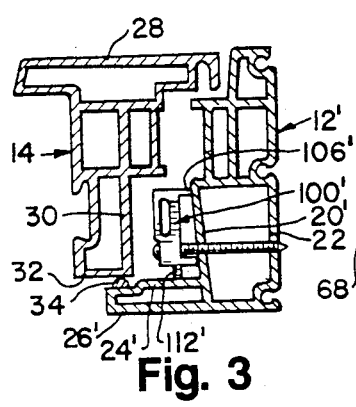
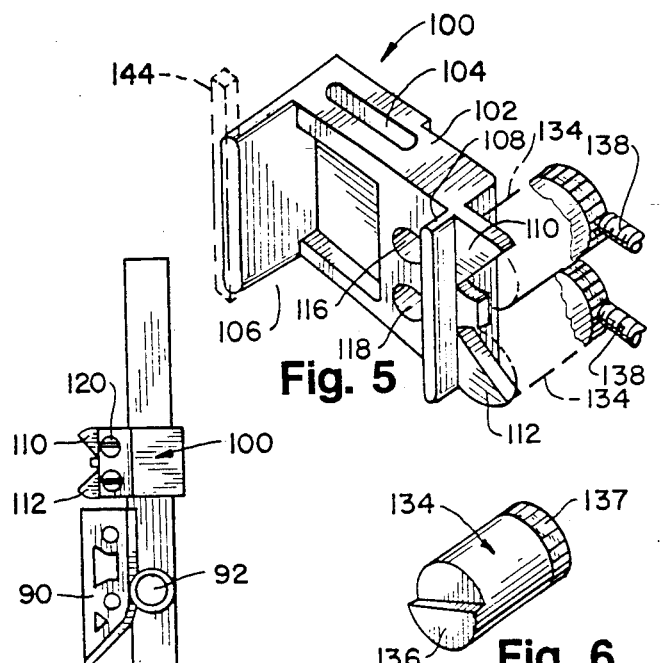
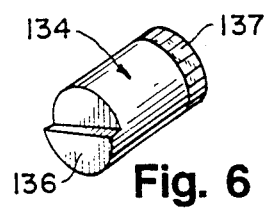
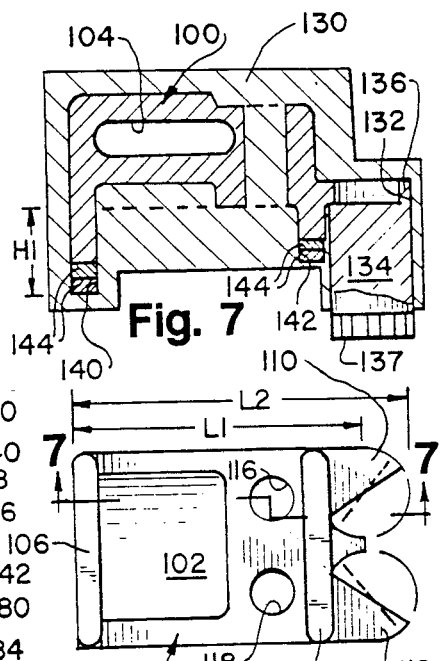
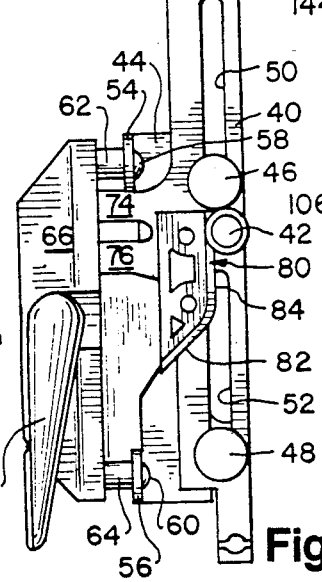

METHOD OF MAKING A VARIABLE MOLDED PART

BACKGROUND OF THE INVENTION

1. Technical Field

The present invention is directed toward a method of making molded parts having variable outer dimension requirements, and more particularly toward a method of making lock tie bar guides for assorted window configurations.

2. Background Art

Movable windows in general use sashes, which are either sliding, double hung or pivotal, with the latter type including awning and casement windows. Many different forms of window locks are available for locking a movable window.

Commonly window locks include a handle on the interior side of the window frame, which handle can be manipulated to cause a cam member to grasp a keeper secured to the window sash. Enhanced security can be provided by locks which include two cam members and two keepers spaced apart on one side of the window frame and sash. Such locks typically include one cam member and one keeper adjacent the handle mechanism, and connect the handle to the other cam member by a tie bar.

It is crucial for proper operation of locks having two spaced cam members that the tie bar be mounted to the window frame strongly enough to provide the desired security against forced entry. Further, smooth operation of the lock requires that the tie bar be mounted in a manner which allows easy reciprocation during operation without twisting or bending. Tie bar guides, usually molded plastic parts, are typically fixed to the window frame to mount the lock tie bar.

However, locks are commonly used in a variety of different windows which, even though similar in appearance to an observer when closed, include differently oriented sash and frame insulation surfaces defining the opening within which the lock is mounted. Accordingly, though virtually identical lock components may be used with such different windows, identical tie bar guides cannot be used with all such windows as they will not be properly oriented to properly secure the tie bar while at the same time ensuring that the tie bar not bind from twisting or bending during operation. Providing appropriate tie bar guides for all of the different window configurations can be disproportionately costly to the overall cost of the lock. Further, in view of the virtually limitless different types of configurations possible and the ever increasing proliferation of new window configurations, creation of a new tie bar guide for each new window configuration can be undesirably time consuming and can thereby hinder sales of the entire lock to manufacturers of new windows.

The present invention is directed toward overcoming one or more of the problems set forth above.

SUMMARY OF THE INVENTION

In one aspect of the present invention, a method is disclosed for variably making tie bar guides usable to guide tie bars within locking system housings having different inner dimensions, which tie bar guides have a body portion including four sides substantially aligned with an opening through the body portion for slidably receiving a tie bar. A mold block defines an opening for the body portion of the guide and receives material in a substantially flowable state. A cylindrical channel is also provided in the mold block along one side of said body portion opening. A semi-cylindrical pin is secured within the channel, which pin is pivoted to open a selected portion of the channel to the mold block opening and thereby extend the mold block opening and contiguous open channel to a selected outer dimension. Material is then flowed into the mold block opening for forming the selected tie bar guide, the material is allowed to harden into the shape of the selected tie bar guide, and the tie bar guide is removed from the mold block.

In another aspect of the present invention, at least one slot is provided along a second side of the body portion opening, which second side is substantially at right angles to the body portion opening one side having the channel therein. Prior to flowing material into the mold block, a selected number of substantially uniform slats sufficient to block the slot at the selected outer dimension are inserted into the slot.

It is an object of the invention to provide a method for inexpensively making tie bar guides which can be adapted to use in virtually any configuration window, which tie bar guides will also properly secure the tie bar to ensure smooth operation without undesirable bending or twisting.

It is another object of the present invention to provide a method of making tie bar guides which can be quickly and easily adapted to making such guides to fit in virtually any window configuration, thereby enhancing the sales of the overall lock by providing virtually immediate product for customers no matter what the customer's window configuration.

BRIEF DESCRIPTION OF THE DRAWINGS

FIG. 1 is a fragmentary, perspective view of a window shown in an open position;

FIG. 2 is a sectional view taken generally above a window lock tie bar guide made according to the present invention and showing the structure in association with the window frame and window sash;

FIG. 3 is a sectional view similar to FIG. 2, but showing a tie bar guide in association with a different window frame;

FIG. 4 is a side elevation of one example of window lock hardware with which a tie bar guide made according to the present invention may be used, said lock being shown in the locked position without association with the window sash and window frame;

FIG. 5 is a perspective view illustrating the method of making the tie bar guide;

FIG. 6 is a perspective view of a pivotable pin usable in making tie bar guides having a selected outer dimension;

FIG. 7 is a cross-sectional view such as would be seen along line A—A of FIG. 8, but showing a tie bar guide in association with a mold block while being made according to the present invention; and FIG. 8 is a plan view of a tie bar guide made according to the present invention.

DESCRIPTION OF THE PREFERRED EMBODIMENT

A window lock 10 with which tie bar guides made according to the present invention may be used is shown in FIG. 1. The window has a window frame, indicated generally at 12, in which the window sash, generally indicated at 14, of a casement window is pivotally mounted. The mounting of such a window by hinges is well known in the art as well as use of a window operator, indicated generally at 16, for moving the window sash between closed and fully open positions or any desired position therebetween.

Of course, as will be readily recognized, window locks such as shown herein can also be used for awning-type windows (in which the window sash pivots about a horizontal axis, rather than the vertical axis of the casement window). Further, such window locks could also be used with other types of movable windows, such as a double hung window.

Window locks using tie bar guides have particular utility with a vinyl window, one embodiment of which is shown fragmentarily in FIG. 2. The window frame 12 has vertical wall sections 20, 22 suitably integrally interconnected by interconnecting walls and with a pair of interconnected vertical walls 24, 26 extending at right angles thereto and with the wall 26 defining a room-facing surface of the window frame 12.

Of course, a large variety of window frame configurations are common among different window manufacturers. Yet another such configuration is shown in FIG. 3, which has vertical wall sections 20', 22' suitably integrally interconnected by interconnecting walls and with a pair of interconnected vertical walls 24, 26' extending at right angles thereto and with the wall 26' defining a room facing surface of the window frame 12'.

The window sash 14 has a vertical exterior wall 28 with integrally associated walls including a wall 30 extending normal thereto which defines one of the walls mounting a vertical face panel 32 which can be brought closely adjacent to the vertical frame wall 24 when the window is closed and with a suitable weather strip 34 assuring a tight seal.

One example of a window lock which requires tie bar guides made according to the present invention is disclosed in Nolte et al. U.S. Ser. No. 535,282 (filed June 7, 1990), entitled "Window Lock" and having a common assignee with this application. The disclosure of that application is hereby incorporated by reference. Such a window lock is shown generally in FIG. 4.

Specifically, that window lock has a slider 40 movable in a path extending lengthwise thereof and which mounts a cam member, in the form of a roller 42. The slider 40 is movable in said path by its mounting on a planar part of a bracket 44 which mounts a pair of shouldered guide rivets 46, 48 which extend through the slider slots 50, 52, respectively, and which enable movement of the slider from a window unlocked position to a window locked position.

The bracket 44 has a pair of bracket flanges 54, 56 at right angles to the planar part thereof which can receive a pair of fasteners 58, 60, respectively, which thread into a pair of alignment bosses 62, 64 extending inwardly from the lock housing 66 and which fit into a slot formed in the walls 24, 26 of the frame 12. The fasteners 58, 60 can draw the bracket flanges 54, 56 against the inner face of the frame wall 24 and the perimeter of the housing 10 against the wall 26 to capture the window frame therebetween.

The housing 66 rotatably mounts the handle 68 for movement between two limit positions. One of these limit positions is the window locked positions, as shown in FIG. 4, wherein the handle 68 extends downwardly.

The slider 40 and handle 68 have coacting means whereby rotation of the handle 68 results in linear movement of the slider along the path lengthwise of the slider 40. Such operation can be suitably obtained by, for example, a drive link (not shown) which rotates with the handle 68 and which is secured between tines 74, 76 of a forked section of the slider 40. Thus, pivoting the handle 68 counterclockwise (as viewed in FIG. 4) to the position shown in FIG. 4 moves the lock 10 to the window locked position. Similarly, pivoting the handle 68 clockwise from the position shown in FIG. 4 moves the lock 10 to the window unlocked position.

During locking action of the lock 10, the roller 42 on the slider 40 coacts with a ramped keeper 80 which is mounted by suitable means to the vertical wall 30 of the window sash 14. The ramped keeper 80 has an inclined ramp section 82 and a generally planar section 84. The lock 10 is shown in the locked position in FIG. 4, which is reached from the unlocked position by the slider 40 and roller 42 moving up, whereby the roller 42 first engages the inclined ramp section 82 and rolls therealong to draw and maintain the window sash fully closed when the roller 42 moves onto the planar section 82 of the ramped keeper 80.

In order to achieve multi-point locking, the window sash mounts a second ramped keeper 90 similar in construction to the ramped keeper 80 and suitably mounted to the sash vertical wall 30 at a distance from the first keeper 80. A second roller 92 similarly coacts with the ramped keeper 90, said roller 92 being rotatably mounted on a tie bar 94 which is connected to an end of the slider 40 for lengthwise movement therewith. An upper end of the tie bar 94 is movable within a tie bar guide 100 discussed in greater detail below.

Further, the roller 42, 92 and the planar sections of the keepers 80, 90 are bevelled to resist separation therebetween in a direction normal to the path of the slider 40. Such a feature has particular utility for a vinyl window because of the flexibility thereof.

Multi-point locking is achieved with delayed lock-up of the roller 92 and ramped keeper 90 relative to the roller 42 and first ramped keeper 80. This is accomplished by spacing the ramped keepers 80, 90 apart a distance greater than the distance between the rollers 42, 92. This delayed multi-point locking limits the maximum amount of force required at any one time to achieve the full locking of the window.

It is apparent that locks as described above require strong and secure tie bar guides 100 for their operation. To provide smooth and reliable operation, the tie bar guide 100 must be configured and positioned to ensure that the tie bar 94 may easily be moved longitudinally along the proper axis during locking and unlocking operation. Further, the tie bar guide 100 must also strongly anchor the tie bar 94 to the window frame 12 to prevent forced entry through the window when locked (entry might be accomplished by prying the sash 14 sufficiently so that its ramped keeper 90 pulls against the tie bar roller 92 sufficiently hard so that the tie bar 94 and its guide 100 are ripped from their mounting on the window frame 12). Still further, it is important that the tie bar guide 100 be manufactured inexpensively while at the same time be usable in a variety of different configuration window frames.

The method of manufacture of the tie bar guides 100 disclosed herein readily allow for the inexpensive manufacture of guides providing all of these attributes.

Specifically, as best shown in FIGS. 5, 7, and 8, the tie bar guide 100 includes a body portion 102 with an opening 104 therethrough for slidably receiving the tie bar therein. As previously discussed, it is particularly important that this opening 104 be precisely oriented to prevent twisting of the tie bar about its axis or bending of the tie bar along its length, as either type of distortion prevents smooth operation of the lock 10.

On one side of the guide 100, a pair of pads or legs 106, 108 are provided, which pads 106, 108 abut a frame vertical wall section 20 or 20' (see FIGS. 2 and 3) when mounted to the window frame 12. As described in greater detail hereafter, the length of these pads 106, 108 may be varied (as perhaps best seen from a comparison of FIGS. 2 and 3) in order to accommodate different window frame configurations to prevent the guide opening 104 from being misoriented so as to cause undesirable twisting of the tie bar 94.

Further, a pair of variable projections 110, 112 are provided on a second side of the guide 100, as is also described in greater detail hereafter. The size of these projections 110, 112 can also be varied to accommodate different window configurations to prevent the guide opening 104 from being misoriented to one side or another and thus cause undesirable bending of the tie bar 94. Compare, for example, FIGS. 2 and 3, where the portions of the tie bar guide 100' in FIG. 3 are comparable to, but have different dimensions than, the tie bar guide 100 of FIG. 2, and thus the FIG. 3 portions are identified by comparable reference numbers "primed".

A pair of screw holes 116, 118 are also provided through the guide body portion 102, allowing suitable screws 120 (see FIGS. 2 and 3) to be used to secure the guide 100 to the window frame 12.

The tie bar guide 100 can be easily and inexpensively manufactured with a selected dimension outer periphery by molding suitable material (such as hard plastic) as follows.

Specifically, a mold block 130 (see FIG. 7) defines an opening substantially in the shape of the guide 100 and receives the guide material (such as plastic) in a flowable state prior to setting.

The projections 110, 112 are defined on one side of the guide 100 by two cylindrical channels 132 in the mold block 130 which receive a pair of pins 134 having a semi-cylindrical portion 136 on one end (see FIG. 6). The opposite end of each pin 134 includes a number of flatted portions 137 which may be engaged by set screws 138 (see FIG. 5) to secure it in a desired position. Specifically, as perhaps best shown in FIG. 5 (two pins 134 being shown in phantom) and FIG. 8, the size of the projections 110, 112, and thus the length of the guide 100, can be set anywhere from L1 to L2 simply by appropriately turning the pins 134 prior to molding the guide 100.

The slots or openings 140, 142 can also be varied to provide different height pads 106, 108 by insertion of a selected number of slats 144 as shown in FIG. 5 (in phantom) and FIG. 7. Thus, for example, pad 106 can be molded with a height anywhere from zero to H1 see FIG. 7) by inserting the appropriate number of slats 144 prior to molding the guide 100.

Once the mold block 130 is thus appropriately set up to make guides 100 having the desired outer dimensions needed for a particular window configuration, the flowable plastic material is flowed into the mold block opening, the material is allowed to harden into the shape of the selected tie bar guide 100, and the tie bar guide 100 is removed from the mold block 130.

As will be apparent to a person of ordinary skill in the art once they have obtained an understanding of the present invention, the above described method of making tie bar guides will allow for the inexpensive manufacture of guides which can be used in virtually any configuration window.

Further, manufacturing guides according to the present invention will ensure that the guides will properly secure the tie bar to ensure smooth operation without undesirable bending or twisting.

Still further, manufacturing tie bar guides according to the present invention simplifies changing from manufacturing one guide for one window configuration to manufacturing another guide for another window configuration. This not only helps to ensure minimal cost in manufacture, but also can even enhance the sales of the overall lock by providing virtually immediate product for customers no matter what the customer's window configuration.

Still other aspects, objects, and advantages of the present invention can be obtained from a study of the specification, the drawings, and the appended claims.

I claim:

1. A method for making molded parts with a body and variable outer dimensions, comprising the steps of:
   providing a mold block for receiving material in a substantially flowable state, said mold block defining a cavity for the body;
   providing a pin pivotable about a longitudinal axis, said pin including a portion which is asymmetric about said axis and disposed in a channel in the mold block along at least one side of the defined cavity;
   pivoting the pin such that said portion cooperates with said mold block to extend said cavity to a selected outer dimension;
   flowing material into the mold block for forming the molded part;
   allowing the material to harden into the shape of the molded part; and
   removing the molded part from the mold block.

2. The method of claim 1, wherein the pivot axis lies substantially along one side of the defined cavity.

3. The method of claim 1, further comprising the steps of:
   providing at least one slot in the mold block adjacent the body cavity; and
   prior to flowing material into the mold block, inserting a slat into said slot to block the slot at a selected outer dimension.

4. The method of claim 1, wherein the pin is semi-cylindrical about a pivot axis disposed substantially at the minimum selectable outer dimension.

5. A method for variably making tie bar guides usable to guide tie bars within locking system housings having different inner dimensions, said tie bar guides having a body portion including four sides substantially aligned with an opening through the body portion for slidably receiving a tie bar, comprising the steps of:
   providing a mold block for receiving material in a substantially flowable state, said mold block defining a cavity for the body portion of the guide;
   providing a cylindrical channel in said mold block along one side of said body portion cavity;
   pivotally securing a pin with a semi-cylindrical portion within said channel;
   pivoting the pin to open a selected portion of said channel to the body portion cavity and thereby extend said body portion cavity and contiguous open channel to a selected outer dimension;

flowing material into the body portion cavity and contiguous open channel for forming the selected tie bar guide;

allowing the material to harden into the shape of the selected tie bar guide; and removing the tie bar guide from the mold block.

6. The method of claim 5, further comprising the steps of:

providing at least one slot in the mold block along a second side of the body portion cavity, said second side being substantially at right angles to said body portion cavity one side; and prior to flowing material into the mold block, inserting a slat into said slot to block the slot at a selected outer dimension.

7. The method of claim 6, wherein a selected number of substantially uniform slats are inserted into said slot, said number being sufficient to block the slot at the selected outer dimension.

* * * * *